(12) United States Patent
Bygrave

(10) Patent No.: US 12,486,620 B2
(45) Date of Patent: Dec. 2, 2025

(54) RAIL FASTENING DEVICE

(71) Applicant: GANTRY RAILING LTD., Gloucester (GB)

(72) Inventor: Peter Nathan Bygrave, Gloucester (GB)

(73) Assignee: GANTRY RAILING LTD. (GB)

( * ) Notice: Subject to any disclaimer, the term of this patent is extended or adjusted under 35 U.S.C. 154(b) by 774 days.

(21) Appl. No.: 17/634,546

(22) PCT Filed: Jul. 15, 2020

(86) PCT No.: PCT/GB2020/051703
§ 371 (c)(1),
(2) Date: Feb. 10, 2022

(87) PCT Pub. No.: WO2021/038185
PCT Pub. Date: Mar. 4, 2021

(65) Prior Publication Data
US 2022/0282430 A1  Sep. 8, 2022

(30) Foreign Application Priority Data

Aug. 23, 2019 (GB) ..................................... 1912155

(51) Int. Cl.
*E01B 9/32* (2006.01)
*E01B 9/66* (2006.01)

(52) U.S. Cl.
CPC . *E01B 9/32* (2013.01); *E01B 9/66* (2013.01)

(58) Field of Classification Search
CPC ..... E01B 9/32; E01B 9/34; E01B 9/66; B66C 7/08
See application file for complete search history.

(56) References Cited

U.S. PATENT DOCUMENTS 4,480,787 A * 11/1984 Okumura ................... E01B 9/48
  248/560
4,489,885 A * 12/1984 Bryan ....................... E01B 9/30
  238/349

(Continued)

FOREIGN PATENT DOCUMENTS

CN 103508316 A 1/2014
CN 106660760 A 5/2017

(Continued)

OTHER PUBLICATIONS

Chinese Patent Office (CNIPA), "Office Action 1", in Chinese Application No. 202080059635.2, dated Mar. 30, 2023, 6 pages.

(Continued)

*Primary Examiner* — Jason C Smith
(74) *Attorney, Agent, or Firm* — Daniel Maffeo

(57) ABSTRACT

A rail fastening device (10) comprises a clip 16 and a washer (17) for fastening to a rail support (12) by an upstanding bolt 14 having a nut (15), which can be tightened to lock the device (10) in position. The clip (16) and washer (17) comprise respective apertures (18), (19) for receiving the bolt (14). The washer (17) is adapted to rotate as the nut (15) is tightened until a formation on the washer (17) abuts an upstanding formation (24) on the rear of the clip (16) at point A, whereupon continued tightening of the nut (15) causes the washer (17) to pivot at point A around an offset axis, so as to bring the bolt (14) into contact with a front surface (18F) of the clip aperture (18). Further tightening of the nut (15) pivots the washer (17) to a point where any displacement force applied to the clip (16) by the rail is applied directly to the bolt (14) and not to the washer (17). In this manner, the risk of the washer failing, or bolt (14) bending is avoided.

15 Claims, 8 Drawing Sheets

(56) References Cited

U.S. PATENT DOCUMENTS

| | | | | |
|---|---|---|---|---|
| 4,685,618 | A * | 8/1987 | Young | E01B 9/48 |
| | | | | 238/351 |
| 4,943,006 | A * | 7/1990 | Clark | E01B 9/34 |
| | | | | 238/351 |
| 4,967,954 | A * | 11/1990 | von Lange | E01B 9/34 |
| | | | | 238/349 |
| 6,092,735 | A * | 7/2000 | Molyneux | E01B 9/66 |
| | | | | 238/338 |
| 8,973,846 | B2 * | 3/2015 | Buda | E01B 9/483 |
| | | | | 238/351 |
| 9,903,074 | B2 * | 2/2018 | Cox | E01B 9/28 |
| 9,951,479 | B2 * | 4/2018 | Gardner | E01B 9/60 |
| 10,132,044 | B2 * | 11/2018 | Couvreur | E01B 9/66 |
| 10,604,384 | B2 * | 3/2020 | Bygrave | B66C 7/08 |
| 10,947,092 | B2 * | 3/2021 | Bygrave | E01B 9/46 |
| 2022/0282430 | A1 * | 9/2022 | Bygrave | E01B 9/66 |
| 2024/0068503 | A1 * | 2/2024 | Halling | F16B 37/14 |

FOREIGN PATENT DOCUMENTS

| | | | |
|---|---|---|---|
| CN | 109311638 A | 2/2019 | |
| CN | 217710108 U * | 11/2022 | |
| DE | 8533479 U1 | 1/1986 | |
| EP | 0855465 A2 | 7/1998 | |
| EP | 1013827 A1 | 6/2000 | |
| GB | 1599873 A * | 10/1981 | B66B 7/024 |
| GB | 2195382 A * | 4/1988 | B66C 7/08 |
| WO | WO-2015165790 A1 * | 11/2015 | B66C 7/08 |
| WO | WO2017/216568 | 12/2017 | |

OTHER PUBLICATIONS

U.K. Intellectual Property Office, GB Application No. GB1912155.7, "Search Report under Section 17", dated Feb. 17, 2020, 1 page.

* cited by examiner

RAIL FASTENING DEVICE

CROSS-REFERENCE TO RELATED APPLICATION

The present application is a United States National Stage entry under 35 U.S.C. § 371 of International Application No. PCT/GB2020/051703 filed Jul. 15, 2020, designating the United States of America and published in English on Mar. 4, 2021, which is incorporated herein by reference in its entirety.

This invention relates to a device for fastening a rail to the ground or other support structure.

Cranes for dockyards and container terminals etc. run on steel rails which are fastened to the ground or other support structure by a plurality of rail fastening devices arranged at intervals along the rail. The base of a typical rail comprises a pair of oppositely-directed longitudinal flanges, against which the fastening devices clamp to hold the rail in-situ.

WO2015/165790 discloses a typical rail fastening device comprising a clip and an overlying washer for displaceably fastening to a rail support by a bolt which upstands from the support. The clip comprises a rear body portion and forwardly projecting cap portion adapted for abutment with a lateral flange on the foot of the rail. The bolt extends through an aperture in the body portion of the clip, the aperture being elongate with its longer axis extending in a direction oblique to the side of the rail, to enable the clip to be slid towards the rail. The upper surface of the body portion of the clip surrounding the aperture is inclined upwardly from its rear end towards the cap portion of the clip. An apertured washer is provided for fitting onto the bolt over the clip, the washer comprising a bottom surface which inclined at a complementary angle to the upper surface of the clip, such that the upper surface of the washer lies in a plane which extends normal to the axis of the bolt.

In use, the clip is fitted onto a bolt positioned adjacent the rail whereupon the washer is fitted on top of the clip before a nut is loosely secured to the upper end of the bolt. The clip is then slid forwardly towards the rail, which causes the washer to slide down the inclined upper surface of the clip as the rear end of the clip aperture is pushed closer to the bolt. Once in position, the nut can be tightened to fasten the clip in-situ. Typically, the nut is rotated by hand until it abuts the top surface of the washer and is finger tight, whereupon the nut is fully tightened using a spanner.

Cranes for dockyards and container terminals etc. are heavy and can carry substantial loads. Hence, it will be appreciated that the clip is subjected to substantial lateral forces by the rail. A problem with typical rail fastening devices of the above-mentioned type is that the forces acting on the clip are applied to the bolt via the washer which, on some occasions, can cause the washer to fail as it is not designed to withstand such forces. In other instances, this can cause the bolt to bend or break since the washer applies a lateral load to the bolt at a point which is located some distance away from the point where the bolt is anchored to the ground.

With the foregoing in mind, we have now devised an improved rail fastening device.

In accordance with the present invention, there is provided a rail fastening device comprising a clip having a front, a rear and opposite sides, the front comprising a forwardly-projecting cap portion adapted for abutment with the rail to be fastened, the rear comprising a body having an elongate aperture extending obliquely forwardly between the opposite sides towards the front of the clip, the elongate aperture having a front side wall and a rear side wall, the rail fastening device further comprising a washer which is slidable along a substantially planar upper surface of the body of the clip surrounding the elongate clip aperture, the washer having an aperture and a side edge formation disposed radially outwardly of the aperture, the washer being arranged such that said side edge formation thereof is free to abut a point on a rear upstanding formation on the surface of the underlying clip which extends parallel to the elongate clip aperture, such that tightening of an elongate upstanding fastener extending through the aligned apertures of the clip and washer causes the washer to pivot forwardly across the planar surface about said abutment point into a position in which the front side wall of the elongate clip aperture extends as a chord across the washer aperture.

In use, when the rail fastening device is fitted in-situ by tightening the fastener, friction between the fastener and the washer causes the washer to rotate forwardly to a point where the front side wall of the elongate clip aperture extends as a chord across the washer aperture. In this manner, when a load on the rail acts to displace the clip rearwardly, the force is immediately transferred to the fastener because the washer has rotated into a position where it is away from the load bearing side of the fastener. In this manner, the risk of the washer breaking under applied loads is avoided. Also, since the underlying clip and not the washer contact the load bearing side of the fastener, the force applied to the fastener is applied closer to where the fastener is anchored and thus the risk of bending the fastener is avoided.

The front side wall of the elongate clip aperture may be profiled to provide a projection which extends into the aperture at a point below the upper end of the aperture. This helps to ensure that the point of contact between the fastening member and the clip is as low as possible. Ideally, the projection extends into the aperture at a point that is more adjacent the lower end of the aperture than the upper end.

The planar upper surface of the body portion of the clip surrounding the aperture may be inclined upwardly from the rear towards the front the clip. The washer may comprise a bottom surface which is inclined at a complementary angle to the upper surface of the clip, such that in use the upper surface of the washer lies in a plane which extends normal to the axis of the fastener.

The washer may comprise an outwardly-facing straight side edge surface, the pivot formation being provided by one end of the surface.

The rear upstanding formation on the surface of the clip may comprise a straight side edge surface which faces towards and extends parallel to the elongate clip aperture.

The washer may comprise a projection which extends outwardly of its outwardly-facing straight side edge surface over the rear upstanding formation on the surface of the clip: this arrangement helps to ensure that the washer is mounted in the correct orientation on the clip.

Also in accordance with the present invention, there is provided a method of fastening a rail in position using a fastening device as hereinbefore defined, the method comprising engaging the clip and the washer with an elongate upstanding fastening member for securing the fastening device in position, sliding the clip towards the rail, rotating an upper end portion of the fastening device in a tightening direction until it abuts the upper surface of the washer, and causing the washer to pivot forwardly across the planar surface of the clip about said abutment point into a position in which the front side wall of the elongate clip aperture extends as a chord across the washer aperture.

The washer may be caused to pivot to move the fastening member relative to the clip in a direction which brings the fastening member into contact with the front side wall of the elongate clip aperture.

In one embodiment, the fastening device comprises an externally threaded shaft, such as a shaft of a bolt, extending upwardly from a support surface, the method comprising rotating a nut that is threadably mounted on the shaft.

In an alternative embodiment, the fastening device comprises a bolt having an externally threaded shaft which extends into an internally threaded member fixed to a support surface, the method comprising rotating a head of the bolt.

In order to avoid any risk that the action of the washer pivoting against the rear upstanding formation on the clip will cause the clip to be pulled rearwardly away from the rail, the clip may be urged forwardly following rotation of the washer, for example by striking the rear thereof with a hammer or other object, before the fastening member is fully tightened. This latter tightening will not cause rotation of the washer or rearward displacement of the clip and the washer.

An embodiment of the present invention will now be described by way of an example only and with reference to the accompanying drawings, in which.

Figure 1:
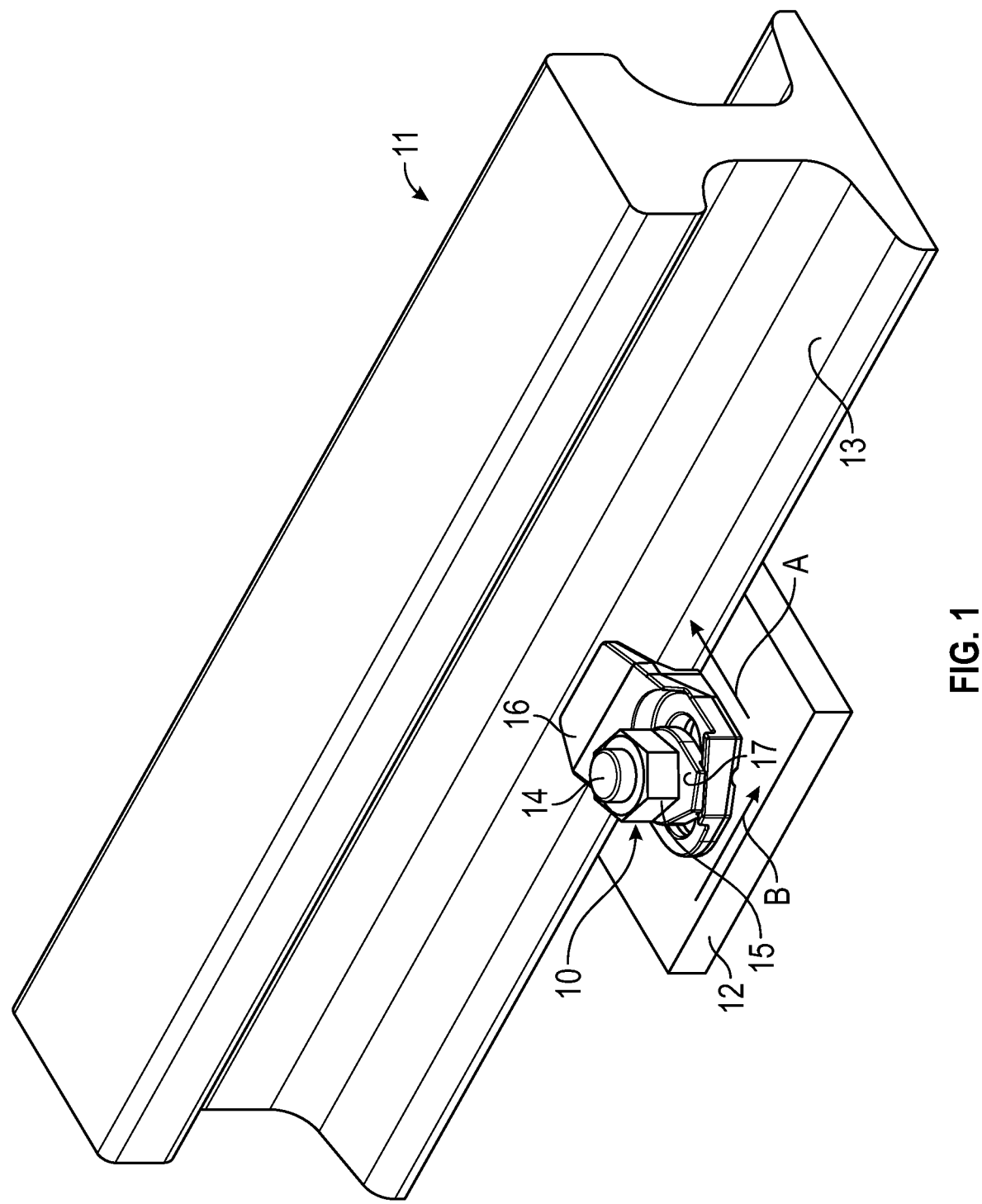
FIG. 1 is a perspective view of a section of rail mounted to a support by means of a rail fastening device in accordance with the present invention.
Figure 2:
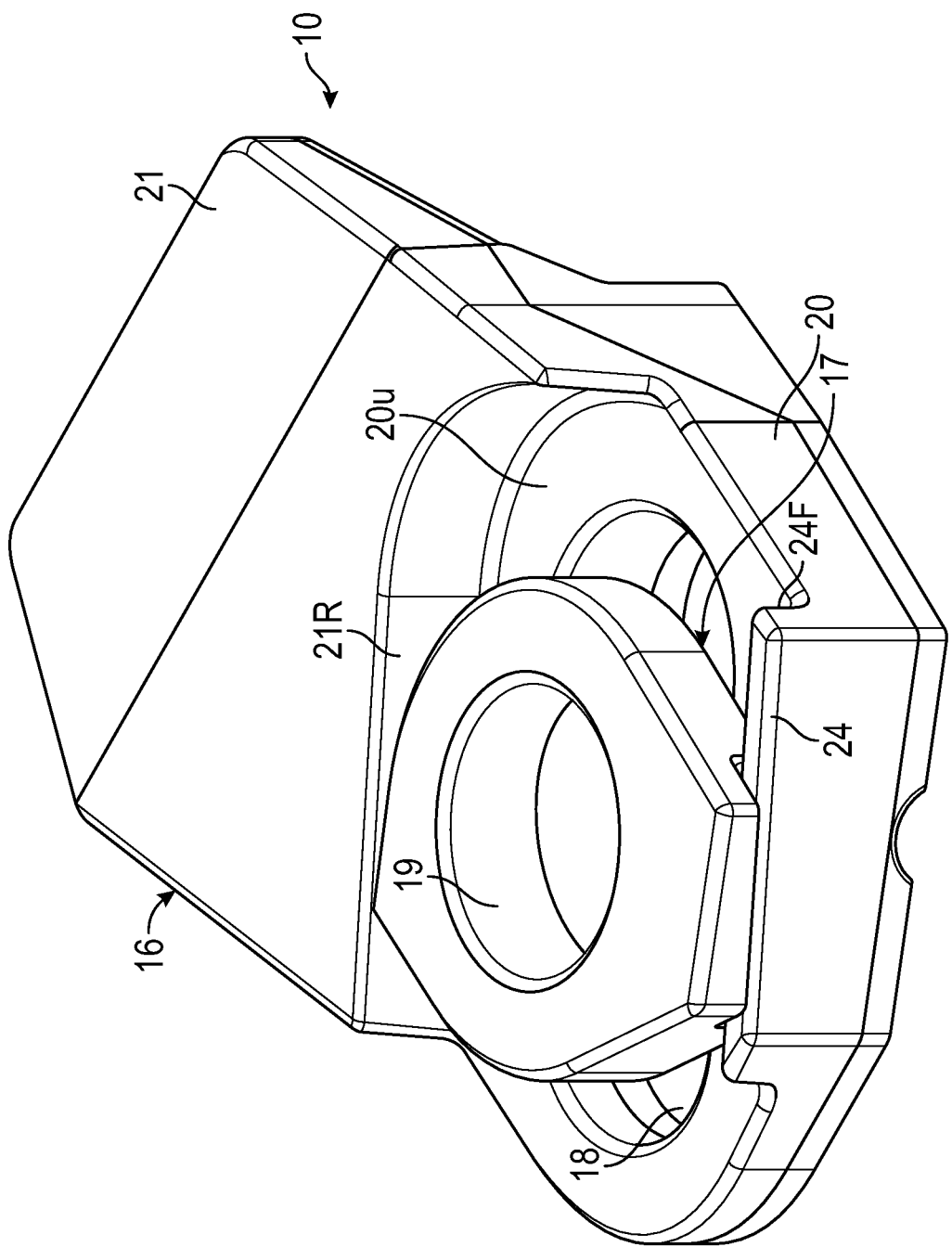
FIG. 2 is a perspective view of the rail fastening device of FIG. 1.

Referring to FIG. 1 of the drawings, there is shown a rail fastening device 10 for fastening an elongate rail 11 to a rail support 12. The rail fastening device 10 is secured in position by a ground anchor bolt 14, which extends upwardly from the rail support 12 through the rail fastening device 10. In use, the rail fastening device 10 is slid towards the rail 11 to engage a laterally projecting flange 13 at the base of the rail 11. The rail fastening device 10 is then locked in situ by tightening a nut 15 threadably mounted to the upper end of the bolt 14. However, it will be appreciated that the rail fastening device 10 could be secured by tightening the head of a bolt which extends downwardly through the device 10 into the rail support 12.

Referring to FIGS. 2 to 6 of the drawings, the rail fastening device 10 comprises a clip 16 and a washer 17 which are displaceably fastened to the rail support 12 by the upstanding bolt 14. The clip 16 is formed of a cast metal and has a front, a rear and opposite sides. The front of the clip 16 comprises a raised forwardly-extending projecting cap portion 21 adapted to abut the flange 13 of the rail 11. An elastomeric cap 22 is a provided on the underside of the projecting cap 21 for engaging the rail 11. The rear of the clip 16 comprises a body 20 having an elongate aperture 18 extending obliquely forwardly between opposite sides of the clip 16 towards the front thereof. The elongate aperture 18 has a front side wall 18F, a parallel rear side wall 18R and arcuate end walls.

Figure 3:
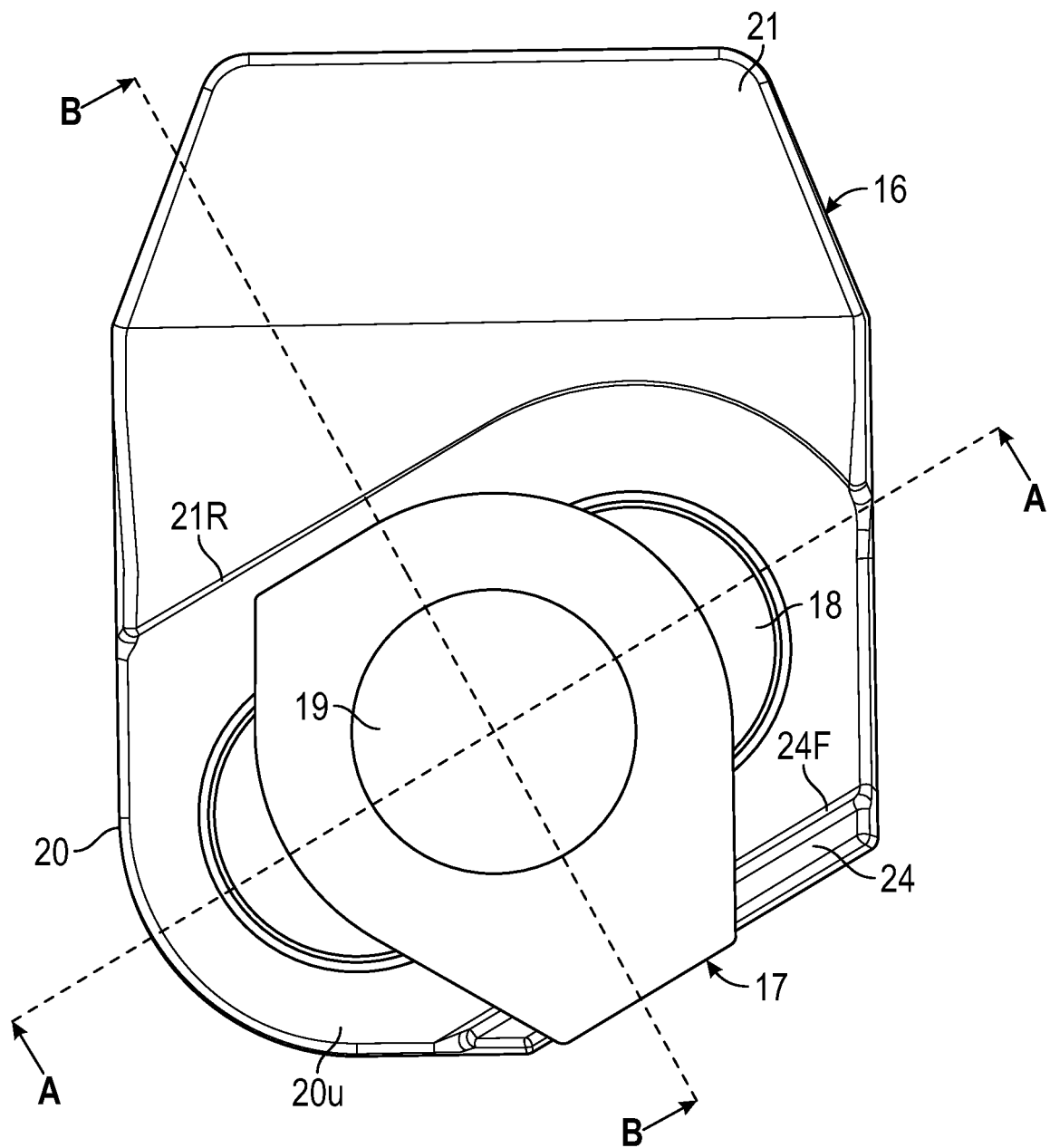
FIG. 3 is a plan view of the rail fastening device of FIG. 1.
Figure 4:
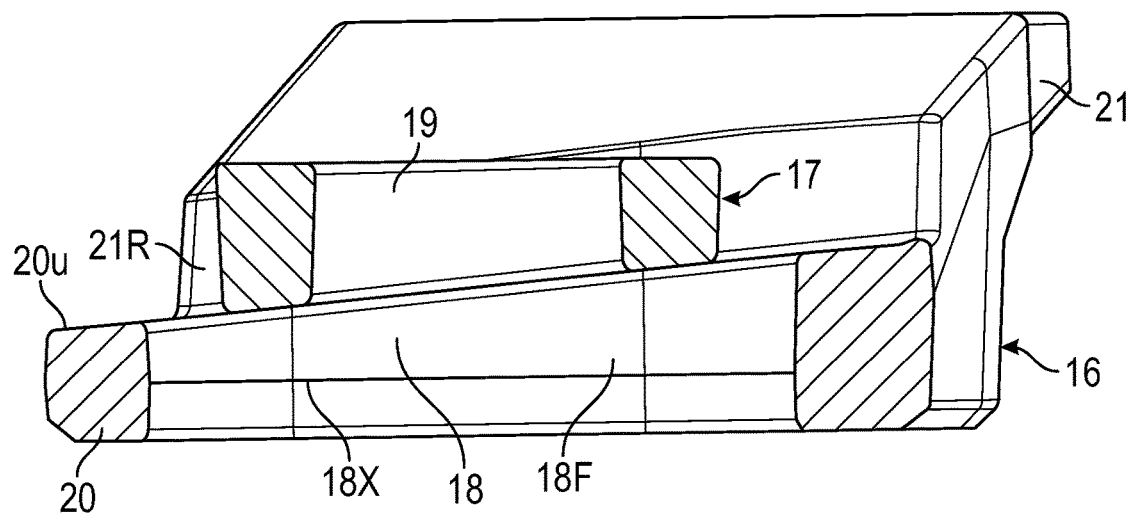
FIG. 4 is a sectional view along the line A-A of FIG. 3.
Figure 5:
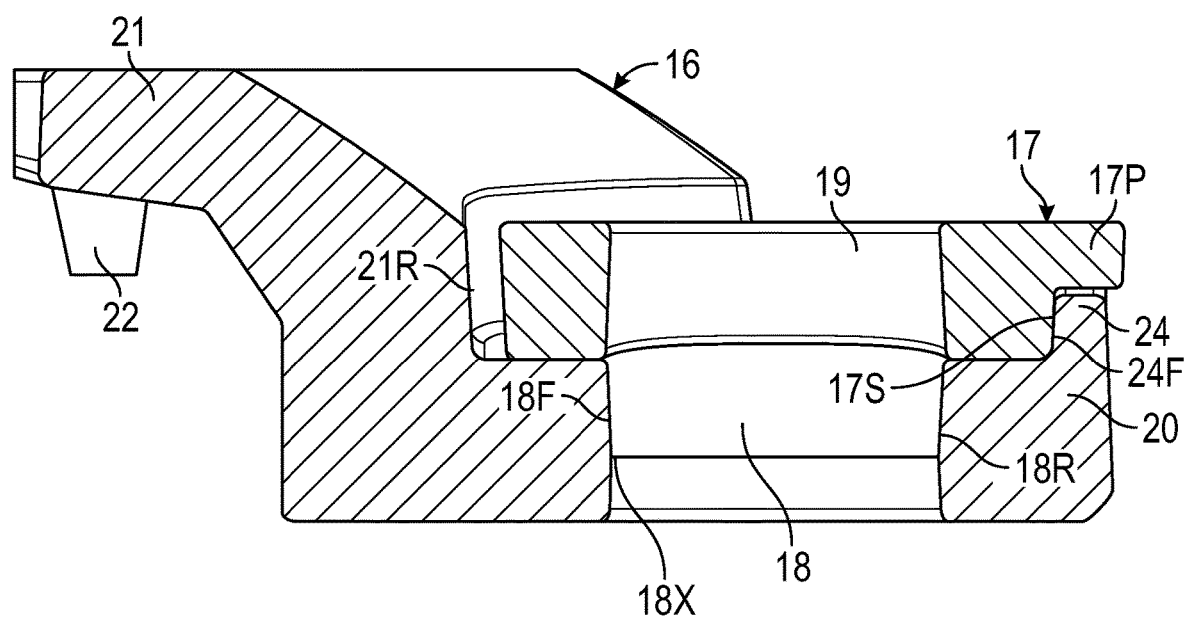
FIG. 5 is a sectional view along the line B-B of FIG. 3.
Figure 6:
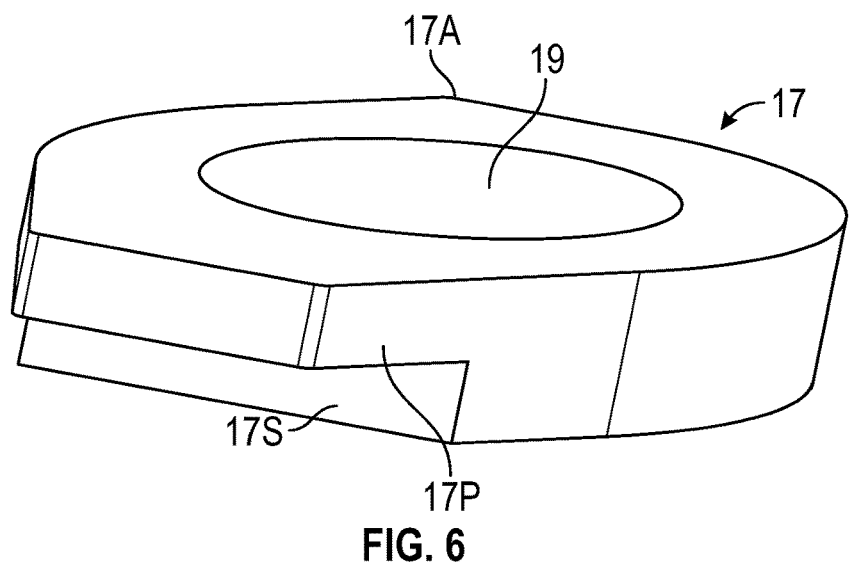
FIG. 6 is a perspective view of a washer of the rail fastening device of FIG. 1.
Figure 7:
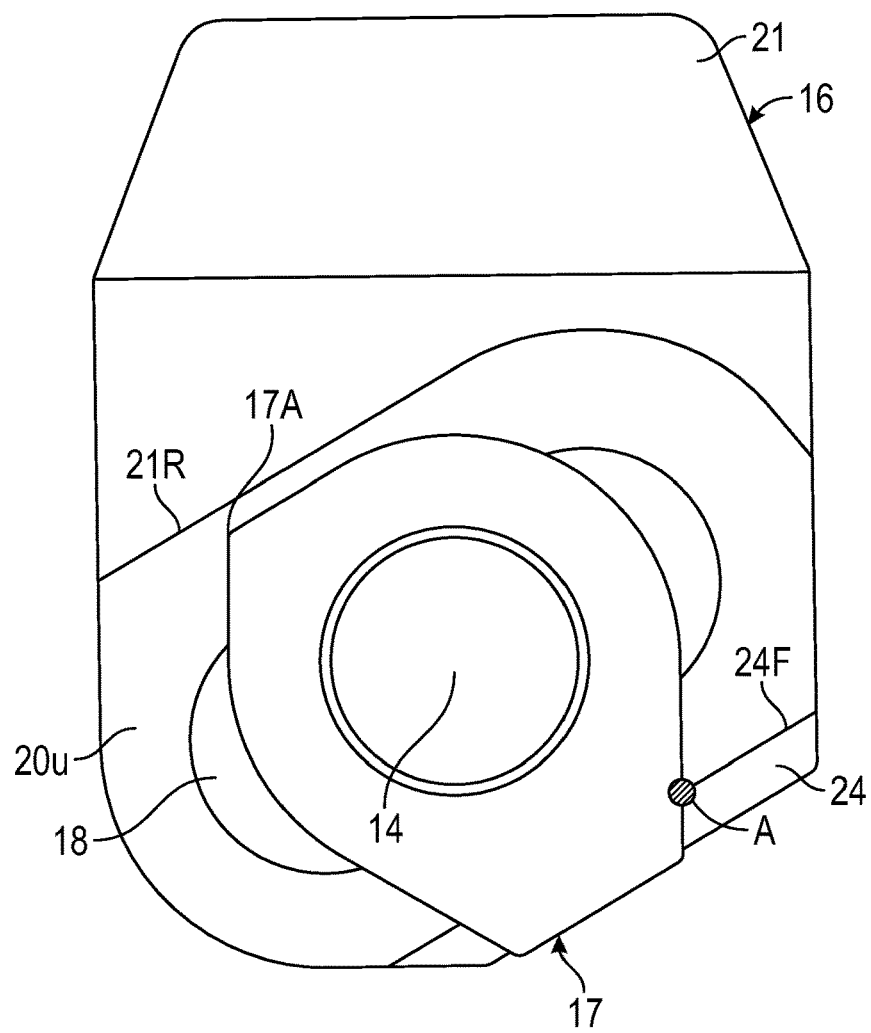
FIG. 7 is a plan view of the rail fastening device of FIG. 1 prior to tightening.
Figure 8:
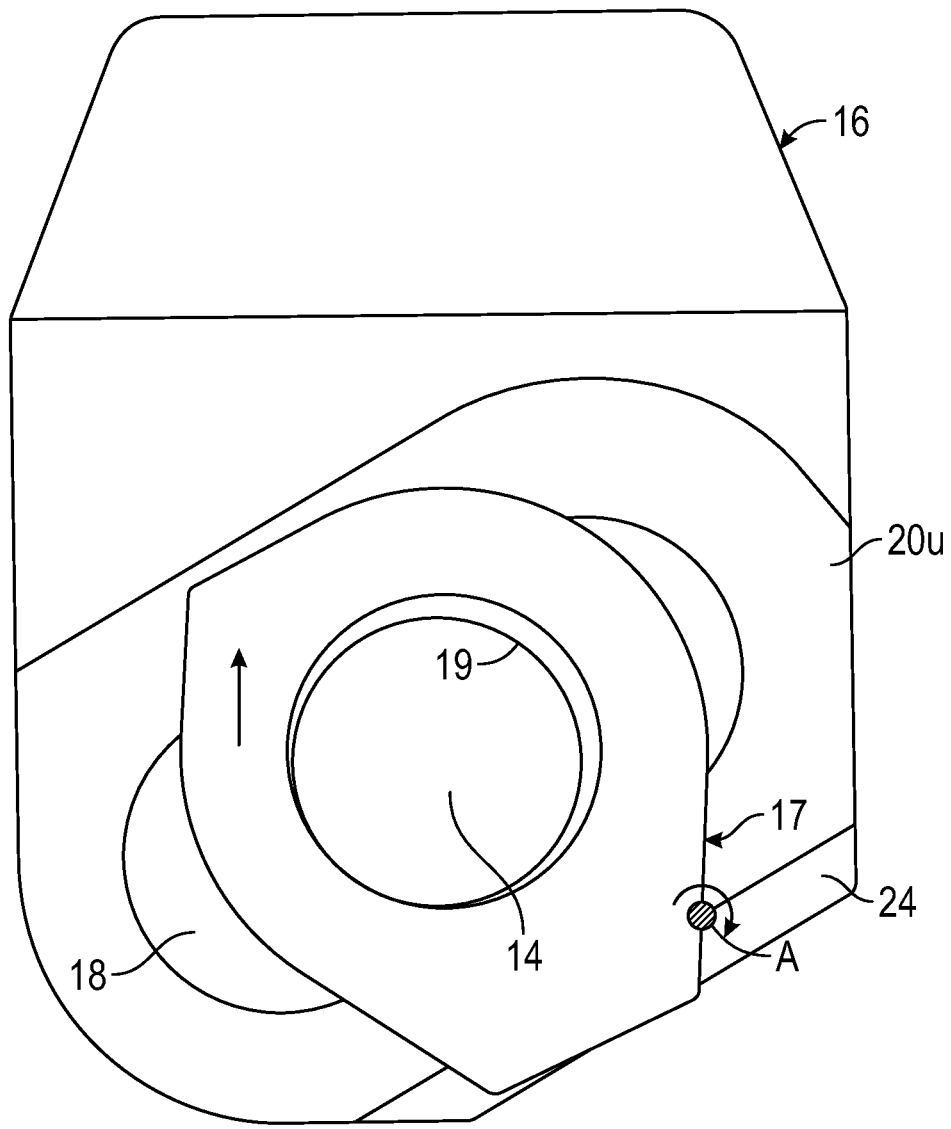
FIG. 8 is a plan view of the rail fastening device of FIG. 1 when partially tightened.

The washer 17 is slidable along a substantially planar upper surface 20U of the body 20 of the clip surrounding the elongate clip aperture 18, so that the clip 16 can be slid towards the rail 11 with the bolt 14 in-situ: it will be appreciated that as the clip 16 is moved in direction A towards the rail 11, the left-hand end of the clip aperture 18 moves towards the bolt 14, as viewed in FIG. 3.

The rear edge of the body 20 of the clip 16 comprises an elongate upstanding wall formation 24, which comprises a straight front side edge surface 24F which faces towards and extends parallel to the elongate clip aperture 18. The cap portion 21 and the upstanding wall formation 24 of the clip 16 are disposed on respective opposite sides of the clip aperture 18. The upper surface 20U of the body 20 of the clip 16 is substantially flat and extends upwardly and forwardly at a shallow angle from the left-hand end of the clip aperture 18 towards its right-hand end, as viewed in FIGS. 3 and 4. The underside of the washer 17 comprises a complementary flat surface, which is similarly angled, so that the upper surface of the washer 17 remains at a constant attitude as the washer 17 is slid axially of the elongate clip aperture 18.

The one side of the washer 17 comprises an outwardly-facing straight side edge surface 17S which extends tangentially relative to the washer aperture 19. A projection 17P extends outwardly of from the upper edge of the outwardly-facing straight side edge surface 17S of the washer 17 and over the elongate upstanding wall formation 24 on the rear end the clip 16: this arrangement helps to ensure that the washer 17 is mounted in the correct orientation on the upper surface 20U of the clip 16. The other diametrically opposite side of the washer 17 comprises a radially projecting abutment formation 17A. The forwardly-projecting cap portion 21 of the clip 20 comprises a rear upstanding wall formation 21R which extends parallel to the elongate clip aperture 18. The front surface 24F of the elongate upstanding wall formation 24 and the upstanding wall formation 21R of the cap portion 21 define a channel having a bottom wall formed by the substantially planar upper surface 20U of the body 20 of the clip 16 surrounding the elongate clip aperture 18.

The front side wall 18F of the elongate clip aperture 18 is chamfered at it opposite ends to provide a projection 18X which extends into the aperture 18 at a point that is more adjacent the lower end of the aperture 18 than the upper end.

Referring again to FIG. 1 and also to FIGS. 7 to 10 of the drawings, in order to fasten the rail 11 in-situ, the clip 16 is initially engaged over the upstanding bolt 14, whereupon the washer 17 is placed around the bolt 14 to engage the upper surface of the clip 16 prior to fitting the nut 15. The clip 16 is then slid forwardly in direction A towards the rail 11, which causes the clip 16 to move laterally to the right in direction B, such that the washer 17 and bolt 14 come in closer proximity to the left-hand end of the clip aperture 18. The nut 15 is then tightened by hand until it engages the upper surface of the washer 17. It will be appreciated that the upper surface of the washer 17 extends in a plane that substantially normal to the longitudinal axis of the bolt 14. It will also be appreciated that the upper surface of the washer 17 moves downwardly as the clip 16 is slid in direction A towards the rail, owing to the co-operation of the angled flat upper surface 20U of the body 20 of the clip 16 with the complementary angled bottom surface of the washer 17. This arrangement provides a self-locking feature to resist movement of the clip 16 away from the rail 11 once the nut 15 is fully tightened.

Once the clip 16 has been slid as far as possible in direction A towards the rail 11, the nut 15 is hand-tightened to engage the washer 17, whereupon the nut 15 can be further tightened using a spanner. This causes the nut 15 to frictionally engage the upper surface of the washer 17, thereby causing the washer 17 to rotate in the clockwise tightening direction about the longitudinal axis of the bolt 14 until the right-hand end of the outwardly-facing straight side edge surface 17S thereof abuts the front side edge surface 24F of the upstanding wall formation 24 on the rear of the clip 16 at point A.

Figure 9C:
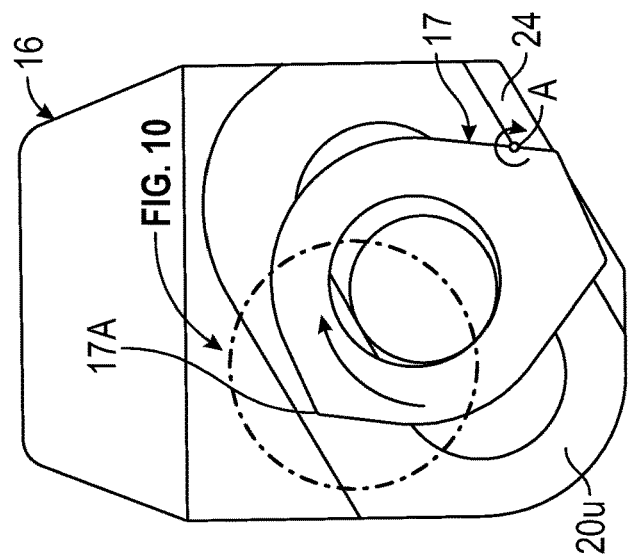
FIGS. 9A to 9C are plan views of the rail fastening device of FIG. 1 at successive stages of tightening.
Figure 9B:
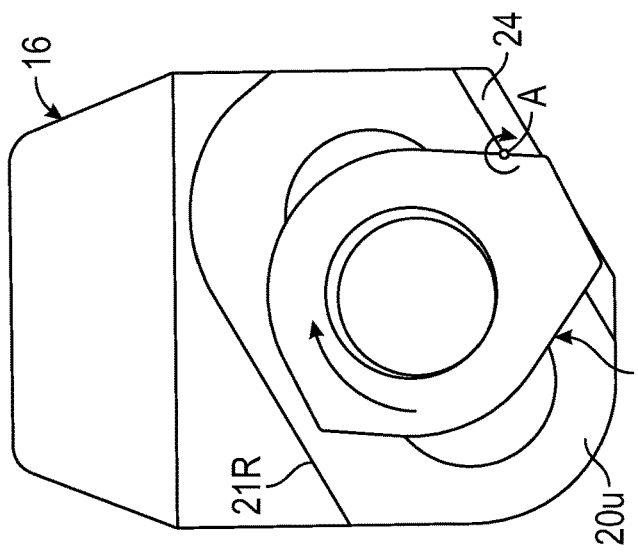
Figure 9A:
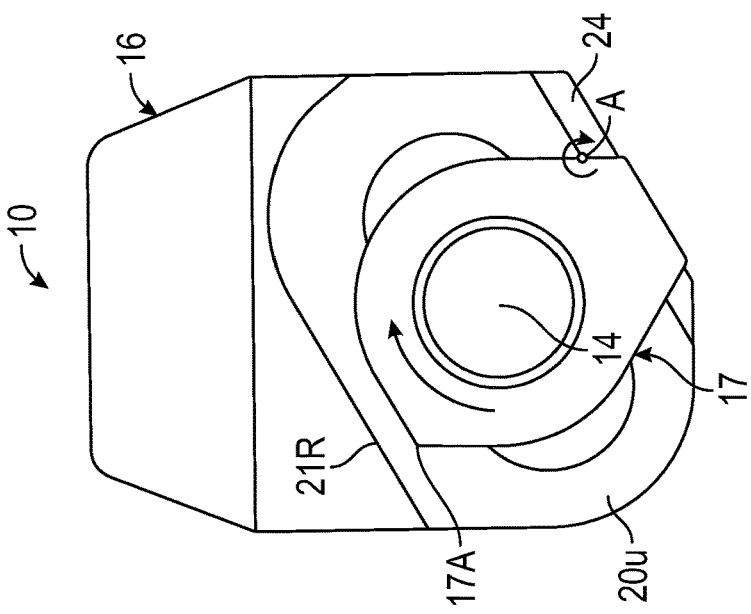
Figure 10:
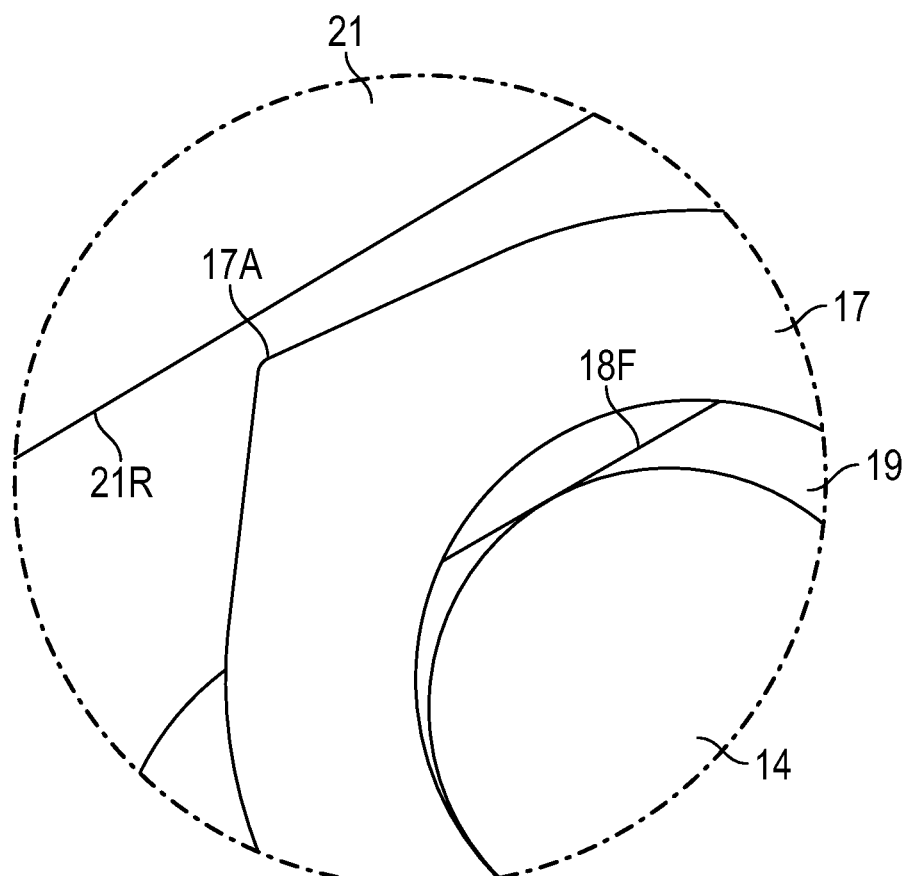
FIG. 10 is an enlarged view of a portion of FIG. 9C.

Further tightening of the nut 15 now causes the washer 17 to rotate in the clockwise direction about the abutment point A across the planar upper surface 20U of the clip 16 until the inner edge of the washer aperture 19 abuts the bolt 14 and urges it against the front side wall 18F of the elongate clip aperture 18, as shown in FIG. 9B. Continued rotation of the nut 15 further rotates the washer 17 about point A into a position in which the front side wall 18F of the elongate clip aperture 18 extends as a chord across the washer aperture 19, as shown in FIGS. 9C and 10.

In order to avoid any risk that the action of the washer 17 pivoting against the front side edge surface 24F of the upstanding wall formation 24 on the clip 16 will cause the clip 16 to be pulled rearwardly away from the rail, the clip 16 can be urged forwardly following rotation of the washer 17, by striking the rear end thereof with a hammer or other object, before the nut 15 is fully tightened.

In use, when a load on the rail 11 acts to displace the clip 16 rearwardly, the force is immediately transferred to the bolt 14 because the washer 17 has rotated into a position where it is away from the front load bearing face of the bolt 14 and where the front side wall 18F of the clip aperture 18 can directly bear against the bolt 14. In this manner, no load is applied to the washer 14 and the risk of the washer 17 breaking under applied loads is avoided. Also, the projection 18X on the front side wall 18F of the clip aperture 18 forms the point of contact with the bolt 14, thereby ensuring that the force applied to the bolt 14 is applied close to where it is anchored and thus the risk of bending the bolt 15 is avoided.

A rail fastening device in accordance with the present invention is simple and inexpensive in construction and comprises a clip 16 and a washer 17 for fastening to a rail support 12 by an upstanding bolt 14 having a nut 15, which can be tightened to lock the device 10 in position. The clip 16 and washer 17 comprise respective apertures 18, 19 for receiving the bolt 14. The washer 17 is adapted to rotate as the nut 15 is tightened until a formation on the washer 17 abuts an upstanding formation 24 on the rear of the clip 16 at point A, whereupon continued tightening of the nut 15 causes the washer 17 to pivot at point A around an offset axis, so as to bring the bolt 14 into contact with a front surface 18F of the clip aperture 18. Further tightening of the nut 15 pivots the washer 17 to a point where any displacement force applied to the clip 16 by the rail is applied directly to the bolt 14 and not to the washer 17. In this manner, the risk of the washer failing, or bolt 14 bending is avoided.

The invention claimed is:

1. A rail fastening device comprising a clip having a front, a rear and opposite sides, the front comprising a forwardly-projecting cap portion adapted for abutment with the rail to be fastened, the rear comprising a body having an elongate aperture extending obliquely forwardly between the opposite sides towards the front of the clip, the elongate aperture having a front side wall and a rear side wall, the rail fastening device further comprising a washer which is slidable along a substantially planar upper surface of the body of the clip surrounding the elongate clip aperture, the washer having an aperture and a side edge formation disposed radially outwardly of the aperture, a rear upstanding formation on the clip extending parallel to the elongate aperture, the side edge formation of the washer being engageable with said rear upstanding formation so as to define a pivot axis, the device further comprising an elongated upstanding fastener extending through the aligned apertures of the clip and washer, wherein the washer is rotatable forwardly about said pivot axis into a position in which the front side wall of the elongate clip aperture extends as a chord across the washer aperture.

2. A rail fastening device as claimed in claim 1, in which the front side wall of the elongate clip aperture is profiled to provide a projection which extends into the aperture at a point below the upper end of the aperture.

3. A rail fastening device as claimed in claim 2, in which the projection extends into the aperture at a point that is more adjacent the lower end of the aperture than the upper end.

4. A rail fastening device as claimed in claim 1, in which the planar upper surface of the body portion of the clip surrounding the aperture is inclined upwardly from the rear towards the front the clip.

5. A rail fastening device as claimed in claim 4, in which the washer comprises a bottom surface which is inclined at a complementary angle to the upper surface of the clip, such that in use the upper surface of the washer lies in a plane which extends normal to the axis of the fastener.

6. A rail fastening device as claimed in claim 1, in which the washer comprises an outwardly-facing straight side edge surface, the side edge formation being provided by one end of the surface.

7. A rail fastening device as claimed in claim 1, in which the rear upstanding formation on the surface of the clip comprises a straight side edge surface which faces towards and extends parallel to the elongate clip aperture.

8. A rail fastening device as claimed in claim 1, in which the washer comprises a projection which extends outwardly of its outwardly-facing straight side edge surface over the rear upstanding formation on the surface of the clip.

9. A method of fastening a rail in position using a rail fastening device having a clip having a front, a rear and opposite sides, the front comprising a forwardly-projecting cap portion adapted for abutment with the rail to be fastened, the rear comprising a body having an elongate aperture extending obliquely forwardly between the opposite sides towards the front of the clip, the elongate aperture having a front side wall and a rear side wall, the rail fastening device further comprising a washer which is slidable along a substantially planar upper surface of the body of the clip surrounding the elongate clip aperture, the washer having an aperture and a side edge formation disposed radially outwardly of the aperture, a rear upstanding formation on the clip extending parallel to the elongate aperture, the side edge formation of the washer being engageable with said rear upstanding formation so as to define a pivot axis, the device further comprising an elongated upstanding fastener extending through the aligned apertures of the clip and washer, wherein the washer is rotatable forwardly about said pivot axis into a position in which the front side wall of the elongate clip aperture extends as a chord across the washer aperture, the method comprising:

positioning the clip adjacent the rail such that the forwardly-projecting cap portion abuts the rail;

engaging the clip and the washer with an elongate upstanding fastening member extending throught the aligned apertures of the clip and the washer;

sliding the clip towards the rail and tightening the fastening member by rotating an upper end portion thereof in a tightening direction until it abuts the upper surface of the washer and causes the washer to pivot forwardly across the planar surface of the clip about the pivot axis into a position in which the front side wall of the elongate aperture extends as a chord across the washer aperture.

10. A method as claimed in claim 9, wherein pivoting of the washer moves the fastening member relative to the clip in a direction which brings the fastening member into contact with the front side wall of the elongate clip aperture.

11. A method as claimed in claim 9, wherein the fastening member comprises an externally threaded shaft extending upwardly from a support surface, the method further comprising rotating a nut that is threadably mounted on the shaft.

12. A method as claimed in claim 9, wherein the fastening member comprises a bolt having an externally threaded shaft which extends into an internally threaded member fixed to a support surface, the method further comprising rotating a head of the bolt.

13. A method as claimed in claim 12, further comprising displacing the clip forwardly by striking the rear thereof with an object.

14. A method as claimed in claim 13, further comprising tightening the fastener following the step of displacing the clip forwardly.

15. A method as claimed in claim 9, wherein the washer slides forwardly along the planar upper surface of the clip prior to pivoting about the pivot axis.

* * * * *